United States Patent [19]

Yamashita et al.

[11] Patent Number: 4,812,758

[45] Date of Patent: * Mar. 14, 1989

[54] METHOD OF OPERATING AN AMORPHOUS-MAGNETIC-ALLOY SENSOR

[75] Inventors: Ichiro Yamashita, Hirakata; Masayuki Wakamiya, Suita; Hiroyuki Hase, Katano; Shinya Tokuono, Ashiya, all of Japan

[73] Assignee: Matsushita Electric Industrial Co., Ltd., Kadoma, Japan

[*] Notice: The portion of the term of this patent subsequent to Dec. 2, 2003 has been disclaimed.

[21] Appl. No.: 853,717

[22] Filed: Apr. 18, 1986

[30] Foreign Application Priority Data

Apr. 18, 1985 [JP] Japan .................. 60-82870
May 8, 1985 [JP] Japan .................. 60-97218

[51] Int. Cl.⁴ .................. G01B 7/24; G01R 33/18; G01L 9/16
[52] U.S. Cl. .................. 324/209; 73/728; 73/DIG. 2
[58] Field of Search .............. 324/209, 262, 234, 236, 324/233; 73/728, 722, 735, 753, 779, DIG. 2, 862.33, 862.34, 862.36, 862.48, 862.68, 862.69

[56] References Cited

U.S. PATENT DOCUMENTS 4,412,454 11/1983 Yamashita et al. .................. 73/728
4,625,562 12/1986 Yamashita et al. .................. 73/728

FOREIGN PATENT DOCUMENTS 61-262064 4/1986 Japan .

OTHER PUBLICATIONS

JP-A-58 221 139 Patent Abstracts of Japan, vol. 8, No. 75 (p. 226) [1512] 7th Apr. 1984; (Matsushita Denki Sangyo K.K.)
JP-A-57 79 461 Patent Abstracts of Japan, vol. 6, No. 162 (p-137) [1040] 25 Aug. 1982 (Hitachi Seisakusho).
WO-A-79/00 369 Jilkon, Leif, 28 Jun. 1979.

*Primary Examiner*—Reinhard J. Eisenzopf
*Assistant Examiner*—Warren S. Edmonds
*Attorney, Agent, or Firm*—Cushman, Darby & Cushman

[57] ABSTRACT

The long-term measurement stability of a magnetostrictive effect strain or stress sensor that uses an amorphous magnetic alloy excited by a magnetic field is improved by generating a magnetic field from an electric current formed from a superposed alternating current waveform and a recurring rectangular current waveform that has a larger amplitude at its start-up and which converges to a smaller amplitude after a predetermined time period or an electric current formed from a superposed direct current component and an alternating current component having constant amplitude and a frequency that varies in a recurring manner between a high frequency and a lower frequency.

8 Claims, 9 Drawing Sheets

Converged part for measuring    Converged part for measuring

METHOD OF OPERATING AN AMORPHOUS-MAGNETIC-ALLOY SENSOR

BACKGROUND OF THE INVENTION

1. Field of the Invention

The present invention relates to an exciting method of magnetic field impressed on amorphous-alloy sensor, and especially an exciting method of magnetic field impressed on, such as, pressure sensor which uses an amorphous magnetic alloy as a sensing part.

2. Description of the Prior Art

Various kinds of sensor devices for detecting stress, strain and the like by utilizing magnetostriction of amorphous magnetic alloy, has been conventionally proposed. Principles of the detection are based on the following manner: Firstly, a magnetic circuit of the sensor is containing at least a part made by amorphous magnetic alloy. Secondly, a strain is generated on the amorphous magnetic alloy part at a measurement operation of an object, for example, strain of stress caused by pressure, tension, bending etc. Thirdly, detection of the change of magnetic characteristics of such magnetic circuit, especially, change of inductance of magnetic circuit is made. Fourthly, measuring of the value of the measurement object (such as stress, strain and the like) is made by the detected change of the magnetic characteristics. In order to detect the change or inductance of the magnetic circuit, a magnetic field generated by alternating current is given to the magnetic circuit. Hereupon, it is well known that the sensitivity of the sensor for detection may be raised, reproducibility can be improved, and thermal characteristics can be remarkably improved, by impressing such magnetic field that which is generated by alternating current superposed with direct current on the magnetic circuit. It becomes obvious that, however, the magnetic permeability of the amorphous magnetic alloy changes as time passes thereby deteriorating sensitivity and reliability of the measurement (this phenomenon is generally called as disaccommodation, and hereinafter abbreviated as disaccommodation). Accordingly, when using such amorphous magnetic alloy for a sensor device, a stable output can not be retained for long measuring time.

As mentioned above, the conventional method can not provide stable output because of the disaccommodation or amorphous magnetic alloy during long measuring, while the sensitivity of the conventional amorphous-alloy sensor is good. And therefore, an amorphous alloy sensor of long-time stable characteristic has been demanded.

SUMMARY OF THE INVENTION

Accordingly, the purpose of the present invention is to provide an amorphous alloy sensor capable of retaining long-time stable characteristic.

Exciting of magnetic field for application to amorphous-alloy sensor in accordance with the present invention comprises:

impressing electric current for exciting magnetic field on a magnetic circuit which contains at least amorphous magnetic alloy part, the electric current being an alternating current superposed with a rectangular current which has, in each cycle thereof, a large amplitude at start-up period and converges to a smaller amplitude after passing a predetermined period, impressing measurement object on the amorphous magnetic alloy part for measuring intensity of said measurement object, detecting changes of magnetic characteristics of the magnetic circuit, and outputting signals in proportion to intensity of the measurement object.

DETAILED DESCRIPTION OF THE PREFERRED EMBODIMENTS

Figure 1:
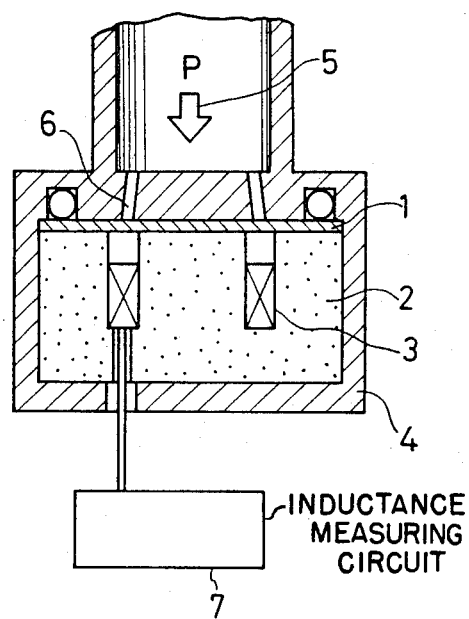
FIG. 1 is a cross-sectional side view showing well-known oil-pressure sensor using an amorphous magnetic alloy.
Figure 2:
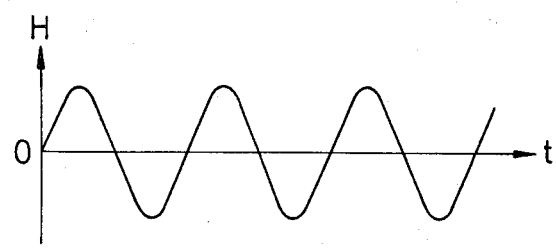
FIG. 2 is a diagram showing a simple waveform of the well known alternating current.
Figure 3:
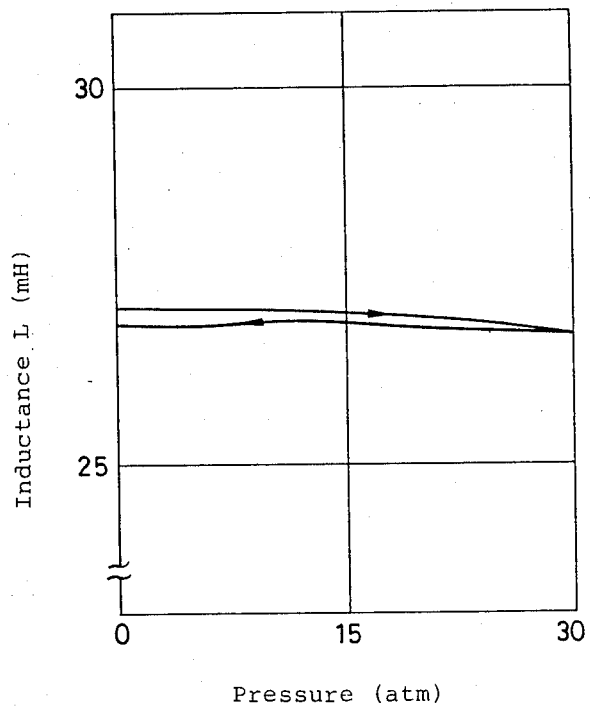
FIG. 3 is a characteristic diagram showing change of the inductance in proportion to pressure intensity under a condition of using a conventional magnetic field generated by the simple alternating current shown in FIG. 2.

As a preferred embodiment of the present invention, an exciting method of magnetic field on amorphous-alloy sensor is described in the following. FIG. 1 is a cross-sectional side view showing an oil-pressure sensor using an amorphous magnetic alloy. In this oil-pressure sensor, a magnetic circuit is constituted by an amorphous magnetic alloy 1 which has magnetostriction and a soft magnetic ferrite 2. Coil 3 for exciting such magnetic circuit is disposed in the center gap part of the soft magnetic ferrite 2. All components such as amorphous alloy 1, soft magnetic ferrite 2 and coil 3 are contained in case 4. Pressure P which may be measured by this oil-pressure sensor is impressed by passing through guide part 5 and through-holes 6 to the amorphous magnetic alloy 1. When the strain occurs on the anorphous magnetic alloy caused by the impression of the pressure, the magnetic characteristics of the amorphous magnetic alloy 1 is changed by magnetostrictive effect. The change of magnetic characteristics is detected by inductance measuring circuit 7, and as a result, the pressure is detected as the value of inductance. When well-known alternating current is impressed on the coil 3 of the above-mentioned oil-pressure sensor, an alternating magnetic field, shown in FIG. 2, is excited on the magnetic circuit. In such case, there are some defects, such as, a relatively low output signal of the inductance measuring circuit 7 corresponding to the change of the inductance value in proportion to the oil-pressure intensity, poor reproducibility, generation of hysterisis, and instability caused by disaccommodation of the amorphous magnetic alloy. FIG. 3 shows the change of the inductance of the magnetic circuit vs. pressure (in atmospheres) of the conventional example, wherein, an alternating magnetic field excited by known alternating current shown in FIG. 2 is used. The arrow marks show the series of measurement points.

Figure 4:
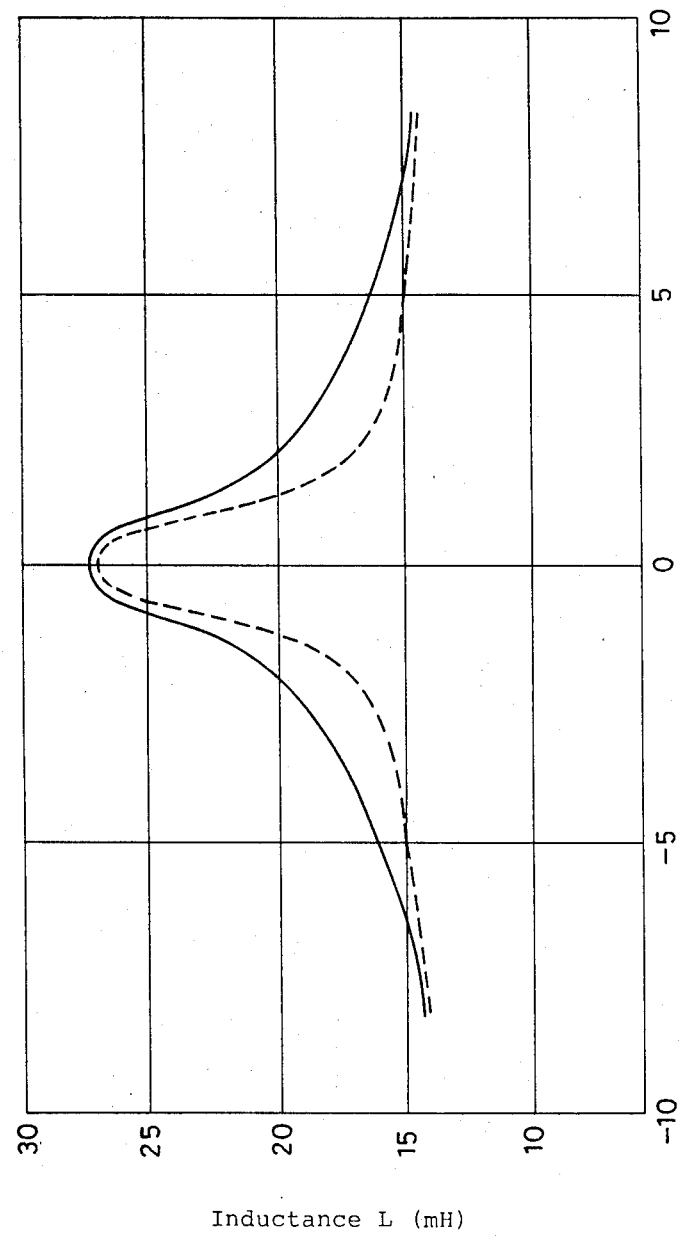
FIG. 4 is a characteristic diagram showing change of inductance intensity in proportion to the value of magnetic field generated by the direct current which superposed on the alternating current in case that such magnetic field is inpressed on the oil-pressure sensor shown in FIG. 1.

FIG. 4 shows the change of inductance in proportion to the intensity of magnetic field excited by direct current which is superposed on alternating current, in a case where such magnetic field was impressed on the oil-pressure sensor shown in FIG. 1 under the conditions of zero atmospheric pressure and 30 atmospheres pressure of the oil-pressure. The temperature was 50° C. and the frequency of the alternating current superposed on the direct current was 20 KHz.

When attention is paid on the inductance values of the line of Hdc=0, namely, which means that the magnetic field was excited by well-known simple alternating current, the change of output level is too small to indicate the oil-pressure intensity thereby. Accordingly, it is observed that the exciting of the magnetic field which uses well-known simple alternating current is not suitable. But, there are suitable magnetic field regions for measuring, when a direct current is superposed on an alternating current, wherein the change of output level is amplified, for example, for such region that Hdc is nearly equal to +2.5.

Figure 5:
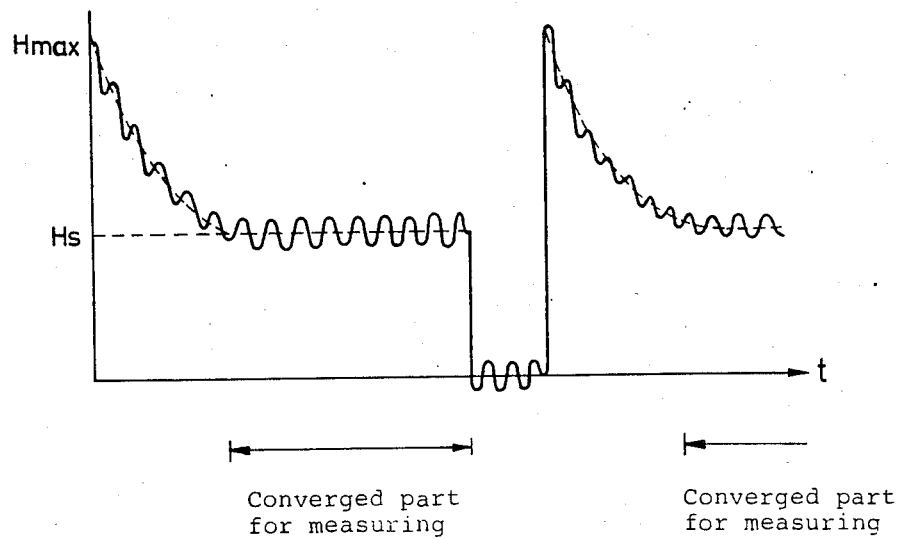
FIG. 5 is a diagram showing a preferred embodiment of waveform in accordance with the present invention which is inputted to an amorphous-alloy sensor for exciting magnetic field.
Figure 6:
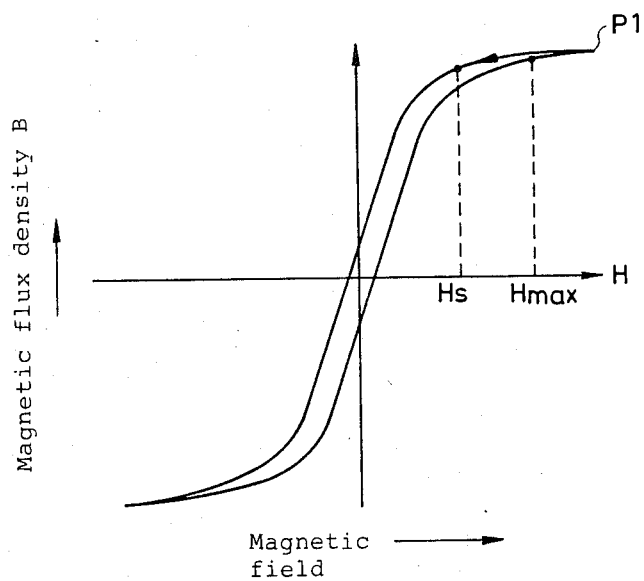
FIG. 6 is a characteristic diagram showing the relation between magnetic flux density and magnetic field (B-H roup) of an amorphous magnetic alloy.

FIG. 5 shows the intensity of a magnetic field excited by an exciting method in accordance with the present invention which is impressed on the amorphous magnetic alloy 1 of the oil-pressure sensor shown in FIG. 1. Such magnetic field has an alternating component and a rectangular component, which are formed, respectively, in proportion to the alternating electric current part and the superposed rectangular electric current path. This magnetic field is characterized by having parts of larger amplitude Hmax at start-up points and parts of smaller amplitude Hs after gradually converging in a predetermined time period. The measuring of the inductance of the magnetic circuit is practiced by using the converged parts of the magnetic field shown in FIG. 5. Such rectangular element of the magnetic field (or the rectangular electric current) repeats after passing a predetermined time period. By impressing the magnetic field shown in FIG. 5 on the amorphous magnetic alloy 1 in FIG. 1 for measuring the intensity of oil pressure, the larger amplitude Hmax of magnetic field orients the magnetic domain of the amorphous magnetic alloy 1. This phenomenon is shown as point P1 of B-H loop in FIG. 6. As a result of the orientation of magnetic domain of the amorphous magnetic alloy, the disaccommodation and other instabilities of the amorphous magnetic alloy are removed, and the level of the output signal of the inductance measuring circuit 7, as shown in FIG. 4, is remarkably improved.

Figure 11:
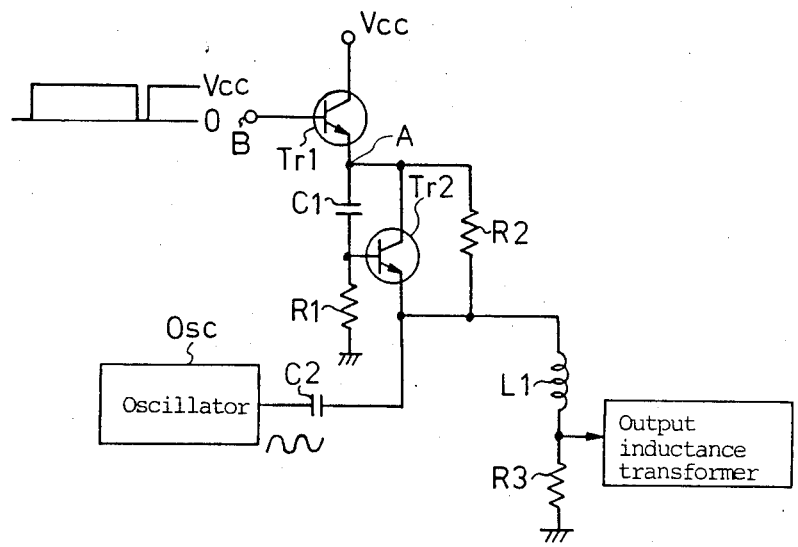
FIG. 11 is a circuit diagram showing an electric circuit for exciting magnetic field shown in FIG. 5.

FIG. 11 shows an embodiment of electric circuit for exciting the magnetic field. The electric power source is periodically switched ON and OFF by a transistor to provide a base signal to the transistor Tr1, and the voltage of point A changes between HIGH and LOW corresponding to the change to the base signal of the transistor Tr1. Transistor Tr2 takes ON state during a time period defined by a time constant of capacitor C1 and resistor R1, and outputs a large amplitude voltage to a coil L1 (hereupon, coil L1 corresponds to coil 3 in FIG. 1) at the start-up point of the voltage of point A. After passing a predetermined time period, the transistor Tr2 changes to its OFF state, and the coil L1 is impressed with converging direct electric current by resistor R2. Alternating current is impressed on the coil L1 by oscillator Osc passing through capacitor C2. By repeating such operation, the magnetic field shown in FIG. 5 is developed.

Figure 7:
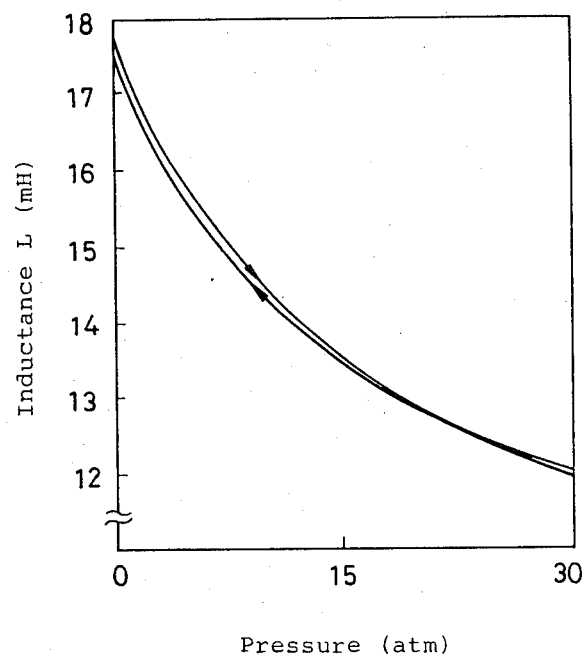
FIG. 7 is a characteristic diagram showing the result measured by a sensor impressed with a magnetic field excited by exciting method in accordance with the present invention.

FIG. 7 shows the measured inductance of the oil-pressure sensor shown in FIG. 1 by using the magnetic field shown in FIG. 5. Compared to the measured result using the conventional method shown in FIG. 2, the reproducibility, stability, and sensitivity of the embodiment are remarkably improved.

Figure 8:
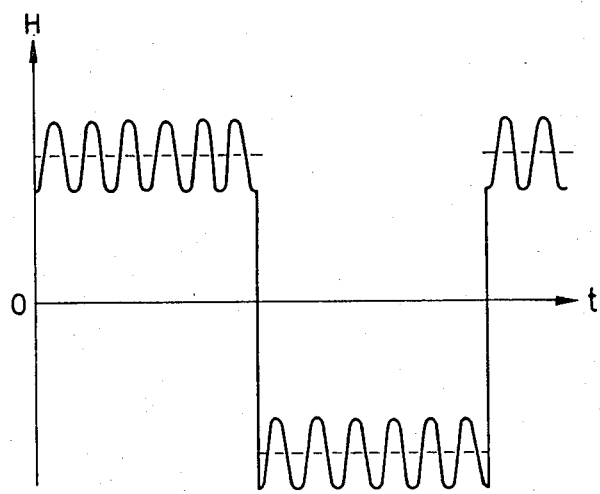
FIG. 8 is a diagram showing another embodiment of waveform in accordance with the present invention which is inputted to an amorphous-alloy sensor for exciting magnetic field.

FIG. 8 shows the waveform of a magnetic field of another embodiment in accordance with the present invention. The FIG. 8 waveform is formed by superposing a magnetic field of larger amplitude and lower frequency rectangular wave and a magnetic field of smaller amplitude and higher frequency alternating current wave. In this embodiment, the low frequency rectangular magnetic field has the same effect as a superposed direct magnetic field excited by direct electric current. Accordingly, the repetition of the rectangular magnetic field dismagnetizes the amorphous magnetic alloy and suppresses the change with the passage of time.

Figure 12:
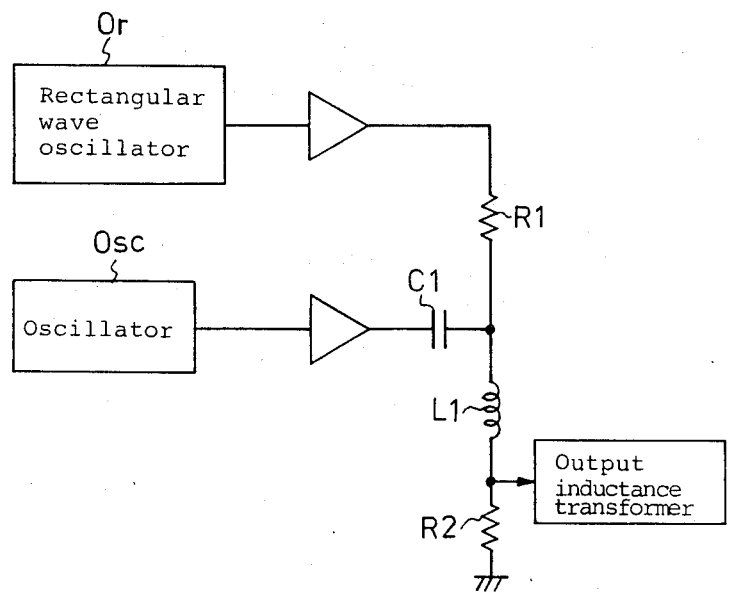
FIG. 12 is a circuit diagram showing an electric circuit for exciting magnetic field shown in FIG. 8.

FIG. 12 shows the electric circuit for providing the exciting magnetic field shown in FIG. 8. Output signal of oscillator Or, which is the lower frequency rectangular electric current, is amplified and impressed on a coil L1 disposed in the ferrite 2 as shown in FIG. 1, passing through a resistor R1. The alternating electric current is output from oscillator Osc, amplified and inputted into the coil L1 passing through capacitor C1. Accordingly, coil L1 excites the magnetic field shown in FIG. 8 by such superposed rectangular electric current and alternating electric current. By impressing the magnetic field shown in FIG. 8 into the oil-pressure sensor shown in FIG. 1, the same output signal of inductance as shown in FIG. 7 is obtainable.

Figure 9:
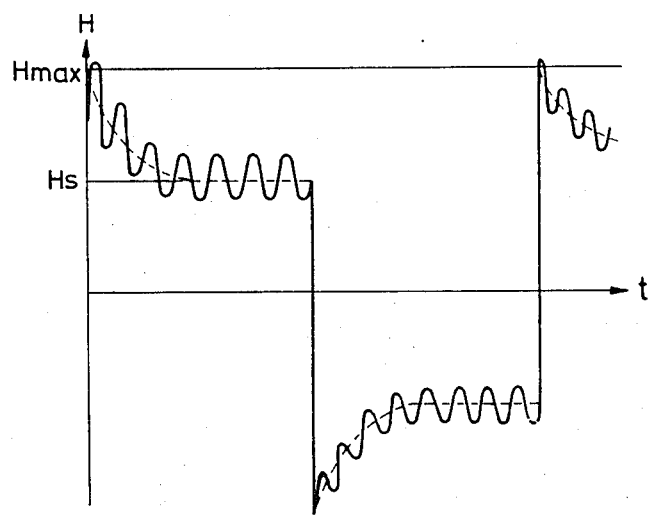
FIG. 9 is a diagram showing still other embodiment of waveform in accordance with the present invention which is inputted into an amorphous-alloy sensor for exciting magnetic field.

FIG. 9 shows the waveform of a magnetic field of still other embodiment in accordance with the present invention. This magnetic field has a larger amplitude part Hmax at its start-up point and converses to a smaller amplitude part Hs after gradually converging in predetermined time period. The measuring of the inductance of the magnetic circuit is practiced by using the converged part of such magnetic field. In this case, the amorphous magnetic alloy is once impressed with the large amplitude magnetic field Hmax, and the magnetic domains of the amorphous magnetic alloy are oriented. And after that, the measuring is practiced so that the amorphous magnetic alloy is magnetically stable. As a result, the disaccommodation and other instabilities of the amorphous magnetic alloy are removed and the level of output signal of the inductance measuring circuit 7 is remarkably improved, as with the above-mentioned embodiments.

Figure 13:
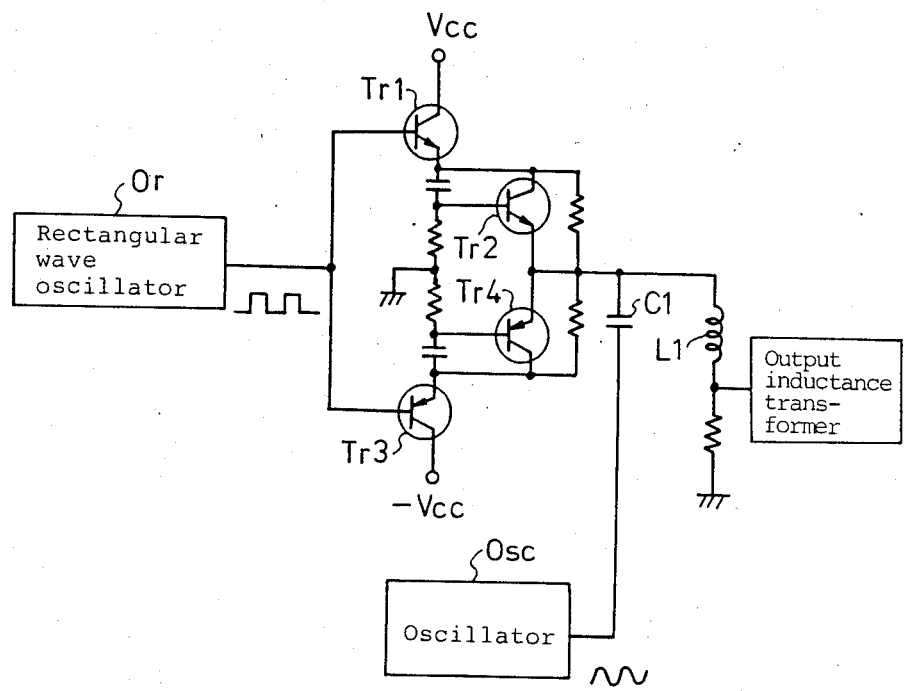
FIG. 13 is a circuit diagram showing an electric circuit for exciting magnetic field shown in FIG. 9.

FIG. 13 shows an example of an electric circuit for exciting the magnetic field shown in FIG. 9. This electric circuit functions similarly to the electric circuit shown in FIG. 12 by using the output signal of low frequency rectangular oscillator Or and picking up the output signals of combinations of transistor Tr1 and Tr2, and Tr3 and Tr4 on $+V_{cc}$ and $-V_{cc}$ terminals. Alternating electric current is output from an oscillator Osc, and impressed on coil L1, passing through capacitor C1. By using such an electric circuit, a magnetic field shown in FIG. 9, which has the pattern that the magnetic field shown in FIG. 5 is periodically reversed, is generated. By impressing the magnetic field shown in FIG. 9 on the oil-pressure sensor shown in FIG. 1, the same output signal for the inductance as shown in FIG. 7 is obtainable.

Figure 10:
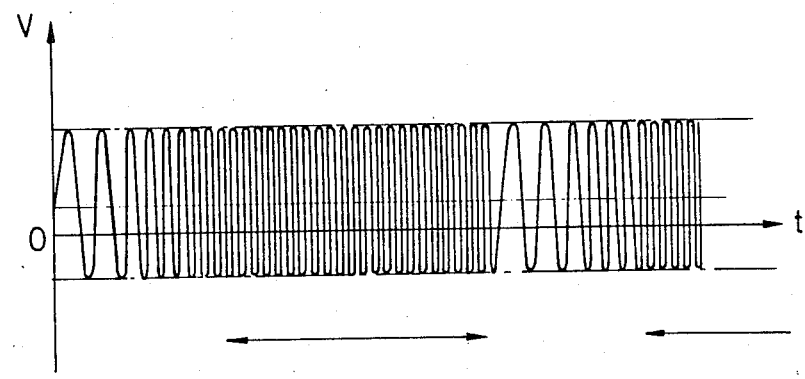
FIG. 10(a) and FIG. 10(b) are diagrams, showing voltage and electric current respectively, for exciting magnetic field in accordance with the present invention.
Figure 10:
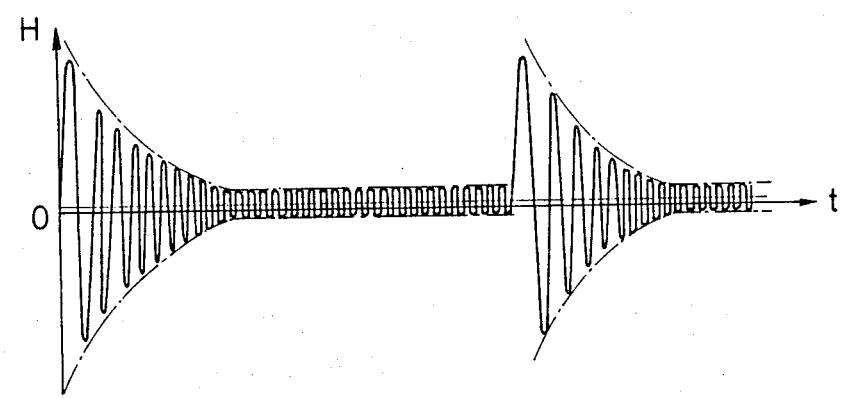

FIGS. 10(a) and (b) show the waveform of voltage and magnetic field of still another embodiment in accordance with the present invention. Measurement of the inductance of the magnetic circuit is made by a magnetic field of higher frequency parts of such waveform, and frequency changing parts between lower frequency to higher frequency are not used. The impedance value Z of the oil-pressure sensor is given by the following expression where L is the inductance of the coil 3 and f is the frequency of the magnetic field:

$$Z = 2\pi f \cdot L \qquad (1)$$

The intensity of the field H impressed on the amorphous magnetic alloy, which is in proportion to the electric current value, is given as:

$$H \propto i \propto V/2\pi f \cdot L \qquad (2),$$

wherein, V is the voltage amplitude across the coil 3. Accordingly, the waveform of magnetic field shown in FIG. 10(b) for dismagnetization is obtainable, and there is no need at all to switch the current from dismagnetizing waveform to measuring waveform or vise versa. This is realized by using alternating voltage of a waveform having constant amplitude and periodically varying its frequency between higher frequency and lower frequency as shown in FIG. 10(a).

Figure 14:
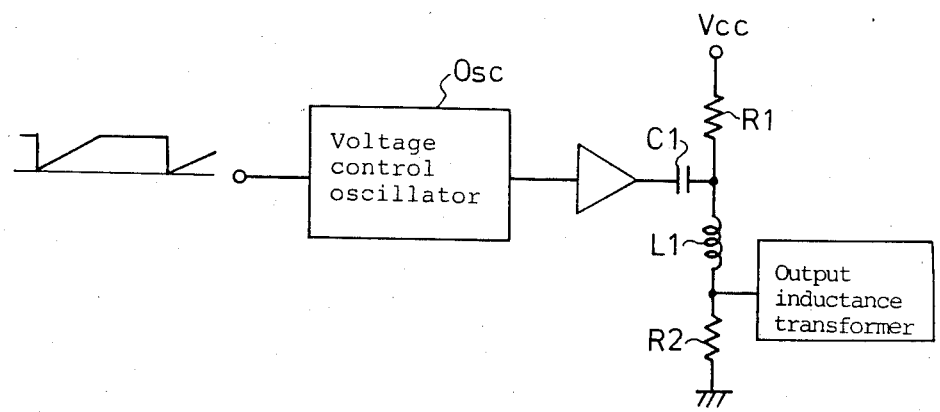
FIG. 14 is a circuit diagram showing an electric circuit for exciting magnetic field shown in FIG. 10(b).

FIG. 14 shows an electric circuit for exciting magnetic field shown in FIG. 10(b). By inputting a control signal having the waveform shown in FIG. 14 into voltage control oscillator Osc, the voltage control oscillator Osc outputs alternating voltage having a periodically varying frequency which varies between a higher frequency and a lower frequency, and such an alternating voltage is amplified and inputted to coil 3, passing through capacitor C1. And a direct electric current is supplied by the electric power source Vcc, passing through a resistor R1. In this case, similar measured result of inductance of the oil-sensor as that shown in FIG. 1, as shown in FIG. 7 is obtainable.

What is claimed is:

1. A method of operating an amorphous-alloy sensor of the type excited by a magnetic field, comprising the steps of:
    impressing an electric current through a coil for exciting a magnetic field on a magnetic circuit which contains at least one amorphous magnetic alloy part,
    said electric current being an alternating current superposed with a cyclically recurring rectangular current which has, in each cycle thereof, a large amplitude at a start-up point and which converges to a smaller amplitude after a predetermined time period,
    impressing a measurement object on said amorphous magnetic alloy part for measuring the intensity of said measurement object,
    detecting the changes of the magnetic characteristics of said magnetic circuit, and
    outputting signals in proportion to the intensity of said measurement object.

2. The method of operating an amorphous-alloy sensor as claimed in claim 1, wherein
    said electric current is formed by superposing at least two different waveforms.

3. The method of operating an amorphous-alloy sensor as claimed in claim 1, wherein
    said electric current is formed by superposing a direct current component and an alternating current component having constant amplitude and gradually and repeatedly varying the frequency between a higher frequency and a lower frequency.

4. A method of operating an amorphous-alloy sensor of the type excited by a magnetic field, comprising the steps of:
    impressing an electric current through a coil for exciting a magnetic field on a magnetic circuit which contains at least one magnetic alloy part having magnetostrictive properties,
    thereby to excite said magnetic field into a form of an alternating current magnetic field comprising a superposed component of a rectangular current which has a large amplitude at a start-up point and converges to a smaller amplitude after passing a predetermined time period,
    impressing a measurement object on said magnetic alloy part for the measuring intensity of said measurement object,
    detecting the changes of the magnetic characteristics of said magnetic circuit, and
    outputting signals in proportion to the intensity of said measurement object.

5. A method of operating an amorphous-alloy sensor of the type excited by a magnetic field, comprising the steps of:
    impressing an electric current through a coil for exciting a magnetic field on a magnetic circuit which contains at least one magnetic alloy part having magnetostrictive characteristics,
    said magnetic field being excited as an alternating magnetic field of which at least one of the amplitude or frequency is variable,
    impressing a measurement object on said magnetic alloy part for measuring the intensity of said measurement object,
    detecting changes of the magnetic characteristics of said magnetic circuit, and
    outputting signals in proportion to the intensity of said measurement object.

6. A method of operating a sensor of the type having an amorphous magnetic alloy with magnetostrictive characteristics, comprising the steps of:
   passing an electric current through a coil for providing a magnetic field in a magnetic circuit that contains at least one amorphous magnetic alloy part, the electric current having an alternating current component and a cyclically recurring rectangular current component having a selected initial amplitude that converges to a smaller amplitude after a predetermined time period;
   exposing the amorphous magnetic alloy to a parameter to be measured, the parameter inducing a stress in the amorphous magnetic alloy; and
   detecting the changes of the magnetic characteristics of the magnetic circuit and providing a signal representative thereof.

7. A method of operating a sensor of the type having an amorphous magnetic alloy with magnetostrictive characteristics, comprising the steps of:
   passing an electric current through a coil for providing a magnetic field in a magnetic circuit that contains at least one amorphous magnetic alloy part, the electric current defined by a first rectangular waveform having a selected amplitude and frequency superposed with an alternating current waveform having a smaller amplitude than the selected amplitude and a higher frequency than the selected frequency;
   exposing the amorphous magnetic alloy to a parameter to be measured, the parameter inducing a stress in the amorphous magnetic alloy; and
   detecting the changes of the magnetic characteristics of the magnetic circuit and providing a signal representative thereof.

8. A method of operating a sensor of the type having an amorphous magnetic alloy with magnetostrictive characteristics, comprising the steps of:
   passing an electric current through a coil for providing a magnetic field in a magnetic circuit that contains at least one amorphous magnetic alloy part, the electric current defined by a an alternating current waveform having a constant amplitude and periodically varying in frequency between a higher frequency and a lower frequency;
   exposing the amorphous magnetic alloy to a parameter to be measured, the parameter including a stress in the amorphous magnetic alloy; and
   detecting the changes of the magnetic characteristics of the magnetic circuit and providing a signal representative thereof.

* * * * *